United States Patent
Meier et al.

(10) Patent No.: US 10,968,293 B2
(45) Date of Patent: Apr. 6, 2021

(54) OLEFIN POLYMERIZATION PROCESS IN A GAS-PHASE REACTOR HAVING THREE OR MORE POLYMERIZATION ZONES

(71) Applicant: Basell Polyolefine GmbH, Wesseling (DE)

(72) Inventors: Gerhardus Meier, Frankfurt (DE); Ulf Schueller, Weiterstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 113 days.

(21) Appl. No.: 16/348,612

(22) PCT Filed: Nov. 9, 2017

(86) PCT No.: PCT/EP2017/078719
§ 371 (c)(1),
(2) Date: May 9, 2019

(87) PCT Pub. No.: WO2018/087209
PCT Pub. Date: May 17, 2018

(65) Prior Publication Data
US 2019/0309107 A1    Oct. 10, 2019

(30) Foreign Application Priority Data
Nov. 10, 2016 (EP) .................................... 16198260

(51) Int. Cl.
*C08F 110/02* (2006.01)
*C08F 2/34* (2006.01)

(52) U.S. Cl.
CPC ................ *C08F 110/02* (2013.01)

(58) Field of Classification Search
CPC .................. C08F 110/02; C08F 2500/07; C08F 2500/12; C08F 2500/14; C08F 2500/05; C08F 2/01; C08F 2/001; C08F 2/34
(Continued)

(56) References Cited

U.S. PATENT DOCUMENTS

| | | |
|---|---|---|
| 6,818,187 B2 | 11/2004 | Govoni et al. |
| 7,414,098 B2 | 8/2008 | Covezzi et al. |
| 7,514,508 B2 | 4/2009 | Meier et al. |
| 7,687,588 B2 | 3/2010 | Mei et al. |
| 8,354,483 B2 | 1/2013 | Bergstra et al. |
| 8,785,572 B2 | 7/2014 | Balestra et al. |

(Continued)

FOREIGN PATENT DOCUMENTS

| | | |
|---|---|---|
| CN | 1867596 A | 11/2006 |
| EP | 2722347 A1 | 4/2014 |

(Continued)

OTHER PUBLICATIONS

The International Search Report and Written Opinion for PCT/EP2017/078719 dated Jan. 23, 2018.
(Continued)

*Primary Examiner* — William K Cheung

(57) ABSTRACT

Process for preparing an olefin polymer including the step of polymerizing an olefin in the presence of a polymerization catalyst and hydrogen as molecular weight regulator in a gas-phase polymerization reactor to yield growing polymer particles, the reactor including three or more polymerization zones and at least two thereof are sub-zones of a polymerization unit wherein the growing polymer particles flow downward in a densified form and at least one polymerization zone has a ratio of hydrogen to the sum of olefins which is a factor of at least 1.5 lower than the ratio of hydrogen to the sum of olefins in the polymerization zone having the highest ratio of hydrogen to the sum of olefins and a factor of at least 1.5 higher than the ratio of hydrogen to the sum of olefins in the polymerization zone having the lowest ratio of hydrogen to the sum of olefins.

19 Claims, 2 Drawing Sheets

(58) Field of Classification Search
USPC .......................................................... 526/65
See application file for complete search history.

(56) References Cited

U.S. PATENT DOCUMENTS

| | | | |
|---|---|---|---|
| 9,725,541 | B2 | 8/2017 | Meier et al. |
| 2009/0036617 | A1 | 2/2009 | Mei et al. |
| 2016/0137759 | A1 | 5/2016 | Brita et al. |
| 2016/0237265 | A1 | 8/2016 | Vittorias et al. |
| 2017/0121512 | A1 | 5/2017 | Vittorias et al. |

FOREIGN PATENT DOCUMENTS

| | | |
|---|---|---|
| EP | 2745926 A1 | 6/2014 |
| KR | 20130042497 A | 4/2013 |
| KR | 20160032114 A | 3/2016 |
| WO | 9704015 A1 | 2/1997 |
| WO | WO 97/04015 * | 2/1997 |
| WO | 0002929 A1 | 1/2000 |
| WO | 2004033505 A1 | 4/2004 |
| WO | 2006120187 A1 | 11/2006 |
| WO | 2009080360 A1 | 7/2009 |
| WO | 2014064060 A1 | 5/2014 |
| WO | 2014064062 A1 | 5/2014 |
| WO | 2014202420 A1 | 12/2014 |

OTHER PUBLICATIONS

D. Geldart, Gas Fluidization Technology, J. Wiley & Sons Ltd., (1986), p. 155.

* cited by examiner

US 10,968,293 B2

OLEFIN POLYMERIZATION PROCESS IN A GAS-PHASE REACTOR HAVING THREE OR MORE POLYMERIZATION ZONES

This application is the U.S. National Phase of PCT International Application PCT/EP2017/078719, filed Nov. 9, 2017, claiming benefit of priority to European Patent Application No. 16198260.8, filed Nov. 10, 2016, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure provides processes for preparing an olefin polymer including the step of polymerizing an olefin in the presence of a polymerization catalyst and hydrogen as molecular weight regulator in a gas-phase polymerization reactor to from growing polymer particles including a polymerization zone in which the growing polymer particles flow downward in a densified form.

BACKGROUND OF THE INVENTION

Hydrogen can be used as a molecular weight regulator in olefins polymerization processes. When polymerizing the olefins in a combination of polymerization zones which have different concentrations of hydrogen, it is possible to broaden the molecular weight distribution of the resulting polyolefin or yield polyolefins having a bimodal or a multimodal molecular weight distribution.

An example of polymerizations reactors which allow broadened or bimodal polyolefins are multizone circulating gas-phase polymerization reactors, wherein the growing polymer particles flow upward through a first polymerization zone (riser) under fast fluidization or transport conditions, leave the riser and enter a second polymerization zone (downcomer) through which the growing polymer particles flow downward in a densified form, leave the downcomer and are reintroduced into the riser, thereby establishing a circulation of polymer between the riser and the downcomer.

Another configuration for preparing polyolefins involves a polymerization reactor having two polymerization zones of different hydrogen concentrations and includes a fluidized bed of growing polymer particles and a connected zone, wherein the growing polymer particles flow downward in a densified form. Polymerization zones, in which the growing polymer particles flow downward in a densified form, can be designated as "moving bed" or "settled bed" unit or reactor.

These polymerization processes are operated in a polymerization reactor having two zones of a different composition of the reaction gas mixture.

SUMMARY OF THE INVENTION

The present disclosure provides a process for preparing an olefin polymer including the step of polymerizing an olefin in the presence of a polymerization catalyst and hydrogen as molecular weight regulator in a gas-phase polymerization reactor to yield growing polymer particles, the gas-phase polymerization reactor including three or more polymerization zones which differ in the ratio of hydrogen to the sum of olefins in the reaction gas mixture within the polymerization zones, expressed as ratios of the volume fractions, and at least two of the polymerization zones are sub-zones of a polymerization unit, wherein the growing polymer particles flow downward in a densified form and at least one of the polymerization zones is a riser wherein the growing polymer particles flow upwards under fast fluidization or transport conditions or a zone wherein the polymerization occurs in a fluidized bed of growing polymer particles, wherein the gas-phase polymerization reactor includes at least one polymerization zone which has a ratio of hydrogen to the sum of olefins which is a factor of at least 1.5 lower than the ratio of hydrogen to the sum of olefins in the polymerization zone having the highest ratio of hydrogen to the sum of olefins and a factor of at least 1.5 higher than the ratio of hydrogen to the sum of olefins in the polymerization zone having the lowest ratio of hydrogen to the sum of olefins.

In some embodiments, the gas-phase polymerization reactor is a multizone circulating reactor wherein a polymerization zone is a riser wherein growing polymer particles flow upwards under fast fluidization or transport conditions and the other polymerization zones are sub-zones of a downcomer wherein the growing polymer particles flow downward in a densified form, wherein the riser and the downcomer are interconnected and polymer particles leaving the riser enter the downcomer and polymer particles leaving the downcomer enter the riser, thereby establishing a circulation of polymer particles through the riser and the downcomer.

In some embodiments, a polymerization zone permits polymerization to occur in a fluidized bed of growing polymer particles.

In some embodiments, a barrier fluid in liquid form is fed into the upper part of a polymerization unit, wherein the growing polymer particles flow downward in a densified form.

In some embodiments, the barrier fluid is made from or contains a composition, when vaporized, yields a gas made from or containing less than 0.5 vol. % hydrogen.

In some embodiments, the barrier fluid is obtained by feeding a part of a recycle gas stream into a distillation column and withdrawing the barrier fluid from the bottom of the distillation column.

In some embodiments, the difference in the ratios of hydrogen to the sum of olefins in the sub-zones of the polymerization unit, wherein the growing polymer particles flow downward in a densified form, is obtained by feeding a part of a recycle gas stream to a sub-zone of the polymerization unit wherein the growing polymer particles flow downward in a densified form.

In some embodiments, the difference in the ratios of hydrogen to the sum of olefins in the sub-zones of the polymerization unit, wherein the growing polymer particles flow downward in a densified form, is obtained by feeding a part of a recycle gas stream into a distillation column, withdrawing a hydrogen-rich gas from the top of the distillation column, and feeding the gas withdrawn from the top of the distillation column to a sub-zone of the polymerization unit wherein the growing polymer particles flow downward in a densified form.

In some embodiments, the hold-up of polymer particles in the polymerization unit, wherein the growing polymer particles flow downward in a densified form, is from 55 wt. % to 80 wt. % of the total hold-up of polymer particles in the gas-phase polymerization reactor.

In some embodiments, the gas-phase polymerization reactor is part of a reactor cascade.

In some embodiments, the reactor cascade includes a fluidized bed reactor upstream of the gas-phase polymerization reactor.

In some embodiments, the polymerization catalyst is a Ziegler catalyst or a Ziegler-Natta-catalyst.

In some embodiments, the olefin polymer is an ethylene polymer prepared by homopolymerizing ethylene or copolymerizing ethylene with one or more comonomers.

In some embodiments, the ethylene polymer has a density of from 0.916 to 0.964 g/cm³, alternatively from 0.935 to 0.960 g/cm³, determined according to DIN EN ISO 1183-1:2004, Method A (Immersion) and a $MFR_{21.6}$ at a temperature of 190° C. under a load of 21.6 kg, determined according to DIN EN ISO 1133-1:2012-03, of from 0.5 to 300 g/10 min.

DETAILED DESCRIPTION OF THE INVENTION

Figure 1:
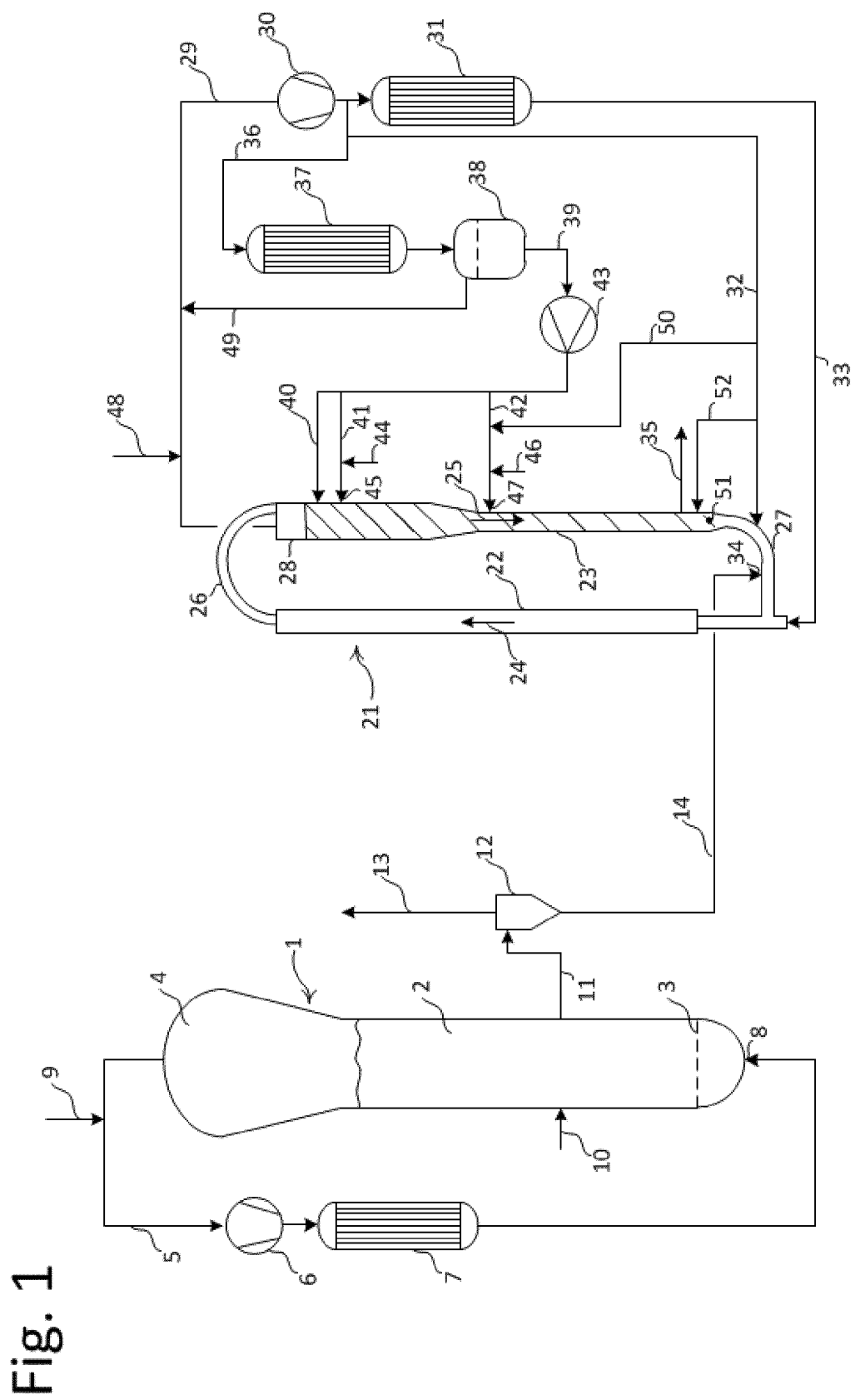
FIG. 1 shows schematically a set-up for carrying out the process of the present disclosure.

In some embodiments, the present disclosure provides a process for preparing an olefin polymer including the step of polymerizing an olefin in the presence of a polymerization catalyst. In some embodiments, the olefin is an 1-olefin, which is a hydrocarbon having terminal double bonds, without being restricted thereto. In some embodiments, the olefin is functionalized olefinically unsaturated compounds. In some embodiments, the compound is selected from the group consisting of ester derivatives of acrylic or methacrylic acid and amide derivatives of acrylic or methacrylic acid. In some embodiments, the compound is selected from the group consisting of acrylates, methacrylates, and acrylonitrile. In some embodiments, the olefin is selected from the group consisting of nonpolar olefinic compounds. In some embodiments, the nonpolar olefinic compounds are selected from the group consisting of aryl-substituted 1-olefins. In some embodiments, 1-olefins are selected from the group consisting of linear or branched $C_2$-$C_{12}$-1-alkenes and conjugated and nonconjugated dienes, and vinylaromatic compounds. In some embodiments, the linear $C_2$-$C_{10}$-1-alkenes are selected from the group consisting of ethylene, propylene, 1-butene, 1-pentene, 1-hexene, 1-heptene, 1-octene, 1-decene and branched $C_2$-$C_{10}$-1-alkenes. In some embodiments, the branched $C_2$-$C_{10}$-1-alkene is 4-methyl-1-pentene. In some embodiments, conjugated and nonconjugated dienes are selected from the group consisting of 1,3-butadiene, 1,4-hexadiene and 1,7-octadiene. In some embodiments, vinylaromatic compounds are selected from the group consisting of styrene and substituted styrene. In some embodiments, the polymerization involves mixtures of various 1-olefins. In some embodiments, the olefin has the double bond as part of a cyclic structure which can have one or more ring systems. In some embodiments, the olefin is selected from the group consisting of cyclopentene, norbornene, tetracyclododecene, and methylnorbornene. In some embodiments, the olefin is selected from the group consisting of 5-ethylidene-2-norbornene, norbornadiene and ethylnorbornadiene. In some embodiments, the polymerization involves mixtures of two or more olefins.

In some embodiments, the process is the homopolymerization or copolymerization of ethylene or propylene. In some embodiments, the process is the homopolymerization or copolymerization of ethylene. In some embodiments, the process is the polymerization of propylene and the comonomers are up to 40 wt. % of ethylene and/or 1-butene, alternatively from 0.5 wt. % to 35 wt. % of ethylene and/or 1-butene. In some embodiments, the process is the polymerization of ethylene and the comonomer are $C_3$-$C_8$-1-alkenes in an amount up to 20 wt. %, alternatively from 0.01 wt. % to 15 wt. %, alternatively from 0.05 wt. % to 12 wt. %. In some embodiments, the $C_3$-$C_8$-1-alkene is selected from the group consisting of 1-butene, 1-pentene, 1-hexene, and 1-octene. In some embodiments, the process is the polymerization of ethylene with from 0.1 wt. % to 12 wt. % of 1-hexene and/or 1-butene.

The polymerization of the present disclosure is carried out in a gas-phase polymerization reactor in the presence of hydrogen as molecular weight regulator. In some embodiments, the reaction gas mixtures within the reactor are made from or contain the olefins to be polymerized and hydrogen as molecular weight regulator. In some embodiments, the olefins are made from or contain a main monomer and one or more optional comonomers. In some embodiments, the reaction gas mixtures are further made from or contain inert gases. In some embodiments, the inert gas is nitrogen, an alkane having from 1 to 10 carbon atoms, or mixtures thereof. In some embodiments, the alkane having from 1 to 10 carbon atoms is selected from the group consisting of methane, ethane, propane, n-butane, isobutane, n-pentane, isopentane, and n-hexane. In some embodiments, the inert gas is nitrogen or propane. In some embodiments, the polymerization is carried out in the presence of a $C_3$-$C_5$ alkane as polymerization diluent, alternatively in the presence of propane. In some embodiments, the inert gas is propane in the case of homopolymerization or copolymerization of ethylene. In some embodiments, the reaction gas mixture is further made from or contains additional components or additional molecular weight regulators. In some embodiments, the additional components are polymerization inhibitors. In some embodiments, the polymerization inhibitor is carbon monoxide or water. In some embodiments, the components of the reaction gas mixture are fed into the gas-phase polymerization reactor in gaseous form or as liquid which vaporizes within the reactor.

In some embodiments, the polymerization is carried out using Phillips catalysts based on chromium oxide, Ziegler- or Ziegler-Natta-catalysts, or using single-site catalysts. For the purposes of the present disclosure, single-site catalysts are catalysts based on chemically uniform transition metal coordination compounds. In some embodiments, mixtures of two or more of these catalysts are used for the polymerization of olefins. In some instances, mixed catalysts are designated as hybrid catalysts.

In some embodiments, the catalysts are of the Ziegler type, alternatively made from or containing a compound of titanium or vanadium, a compound of magnesium and optionally an electron donor compound and/or a particulate inorganic oxide as a support material.

In some embodiments, the titanium compounds are selected from the group consisting of halides of trivalent or tetravalent titanium, alkoxides of trivalent or tetravalent titanium, titanium alkoxy halogen compounds, and mixtures of titanium compounds. In some embodiments, the titanium compounds are selected from the group consisting of $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ and $Ti(O\text{-}n\text{-}C_4H_9)_4$. In some embodiments, the titanium compounds are selected from the group consisting of titanium compounds made from or containing chlorine. In some embodiments, the titanium compounds are titanium halides which are made from or contain only halogen in addition to titanium. In some embodiments, the titanium compounds are titanium chlorides, alternatively titanium tetrachloride. In some embodiments, the vanadium compounds are selected from the group consisting of vanadium halides, vanadium oxyhalides, vanadium alkoxides and vanadium acetylacetonates. In some embodiments, the vanadium compounds are in the oxidation states 3 to 5.

In some embodiments, the production of the solid component uses a compound of magnesium. In some embodiments, the compounds are halogen-based magnesium compounds. In some embodiments, the compounds are magnesium halides, alternatively the chlorides or bromides and magnesium compounds from which the magnesium halides are obtained. For the present purposes, halogens are chlorine, bromine, iodine or fluorine or mixtures of two or more halogens. In some embodiments, the magnesium halides are prepared from chlorine or bromine, alternatively chlorine.

In some embodiments, the halogen-based magnesium compounds are magnesium chlorides or magnesium bromides. In some embodiments, the magnesium compounds from which the halides are obtained are selected from the group consisting of magnesium alkyls, magnesium aryls, magnesium alkoxy compounds, or magnesium aryloxy compounds and Grignard compounds. In some embodiments, the halogenating agents are selected from the group consisting of halogens, hydrogen halides, $SiCl_4$ and $CCl_4$, alternatively chlorine or hydrogen chloride.

In some embodiments, halogen-free compounds of magnesium are selected from the group consisting of diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. In some embodiments, halogen-free compounds of magnesium are selected from the group consisting of n-butylethylmagnesium and n-butyloctylmagnesium.

In some embodiments, the Grignard compounds are selected from the group consisting of methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

In some embodiments, the magnesium compounds are selected from the group consisting of magnesium dichloride, magnesium dibromide, and the di($C_1$-$C_{10}$-alkyl)magnesium compounds. In some embodiments, the Ziegler- or Ziegler-Natta-catalyst is made from or contains a transition metal selected from titanium, zirconium, vanadium, and chromium.

In some embodiments, electron donor compounds for preparing Ziegler type catalysts are selected from the group consisting of alcohols, glycols, esters, ketones, amines, amides, nitriles, alkoxysilanes, aliphatic ethers, and mixtures thereof.

In some embodiments, the alcohols have the formula $R^1OH$ wherein the $R^1$ group is a $C_1$-$C_{20}$ hydrocarbon group. In some embodiments, $R^1$ is a $C_1$-$C_{10}$ alkyl group. In some embodiments, the alcohols are selected from the group consisting of methanol, ethanol, iso-propanol and n-butanol. In some embodiments, the glycols have a total number of carbon atoms lower than 50. In some embodiments, the glycols are 1,2 or 1,3 glycols having a total number of carbon atoms lower than 25. In some embodiments, the glycols are selected from the group consisting of ethylene glycol, 1,2-propylene glycol and 1,3-propylene glycol. In some embodiments, the esters are alkyl esters of $C_1$-$C_{20}$ aliphatic carboxylic acids, alternatively $C_1$-$C_8$ alkyl esters of aliphatic mono carboxylic acids. In some embodiments, the $C_1$-$C_8$ alkyl esters of aliphatic mono carboxylic acids are selected from the group consisting of ethyl acetate, methyl formate, ethyl formate, methyl acetate, propyl acetate, i-propyl acetate, n-butyl acetate, and i-butyl acetate. In some embodiments, the amines have the formula $NR^2_3$ wherein the $R^2$ groups are, independently, hydrogen or a $C_1$-$C_{20}$ hydrocarbon group with the proviso that the $R^2$ groups are not simultaneously hydrogen. In some embodiments, $R^2$ is a $C_1$-$C_{10}$ alkyl group. In some embodiments, the amines are selected from the group consisting of diethylamine, diisopropylamine and triethylamine. In some embodiments, the amides have the formula $R^3CONR^4{}_2$ wherein $R^3$ and $R^4$ are, independently, hydrogen or a $C_1$-$C_{20}$ hydrocarbon group. In some embodiments, the amides are selected from the group consisting of formamide and acetamide. In some embodiments, the nitriles have the formula $R^1CN$ wherein $R^1$ has the same meaning given above. In some embodiments, the nitrile is acetonitrile. In some embodiments, the alkoxysilanes have formula $R^5{}_aR^6{}_bSi(OR')_c$, where a and b are integers from 0 to 2, c is an integer from 1 to 4 and the sum (a+b+c) is 4; and $R^5$, $R^6$, and $R^7$, are alkyl, cycloalkyl or aryl radicals with 1-18 carbon atoms optionally containing heteroatoms. In some embodiments, the alkoxysilanes are the silicon compounds in which a is 0 or 1, c is 2 or 3, $R^6$ is an alkyl or cycloalkyl group, optionally containing heteroatoms, and $R^7$ is methyl. In some embodiments, the alkoxysilanes are selected from the group consisting of methyltrimethoxysilane, dimethyldimethoxysilane, trimethylmethoxysilane and t-butyltrimethoxysilane.

In some embodiments, the electron donor compounds are selected from the group consisting of amides, esters, and alkoxysilanes.

In some embodiments, catalysts of the Ziegler type are polymerized in the presence of a cocatalyst. In some embodiments, the cocatalysts are organometallic compounds of metals of Groups 1, 2, 12, 13 or 14 of the Periodic Table of Elements, alternatively organometallic compounds of metals of Group 13, alternatively organoaluminum compounds. In some embodiments, the cocatalysts are selected from the group consisting of organometallic alkyls, organometallic alkoxides, and organometallic halides.

In some embodiments, the organometallic compounds are made from or contain lithium alkyls, magnesium or zinc alkyls, magnesium alkyl halides, aluminum alkyls, silicon alkyls, silicon alkoxides or silicon alkyl halides. In some embodiments, the organometallic compounds are made from or contain aluminum alkyls or magnesium alkyls. In some embodiments, the organometallic compounds are made from or contain aluminum alkyls, alternatively trialkylaluminum compounds. In some embodiments, the aluminum alkyls are made from or contain trimethylaluminum, triethylaluminum, tri-isobutylaluminum, or tri-n-hexylaluminum.

The process of the present disclosure is characterized in that the polymerization is carried out in a gas-phase polymerization reactor including three or more polymerization zones which differ in the ratio of hydrogen to the sum of olefins in the reaction gas mixture within the polymerization zones. A gas-phase polymerization reactor is a container in which the polymerization is carried out in an interconnected gas-phase. The pressures in the different polymerization zones within this container are the same, apart from pressure differences resulting from flow resistances in gas-phases having high flow velocities, and the conditions in the polymerization zones are not variable independently.

A polymerization zone is a part of the gas-phase polymerization reactor wherein the polymerization takes place under identical conditions. For a polymerization wherein a thorough mixing of the polymer particles occurs, the polymerization zone is the volume of the mixed bed of polymer particles. An example of thorough mixing occurs through polymerization in a fluidized-bed or in a stirred bed of polymer particles. For a polymerization wherein the polymer particles are transported through a part of the reactor, a polymerization zone is the volume between two subsequent feeding points for monomer, hydrogen, or a combination of monomer and hydrogen. As used herein, a monomer feeding point is defined as a position along the path of the transported polymer particles or a height of a vertically oriented reactor part of the polymerization reactor whereat the main monomer and optionally one or more comonomers or a combination of the main monomer, optionally one or more comonomers and hydrogen are fed into the reactor through one or more feeding lines.

The ratio of the concentration of hydrogen to the concentration of the combined olefins in the reaction gas mixture of the respective polymerization zone determines the molecular weight of the produced polyolefin. A larger ratio of hydrogen to the sum of olefins results in a lower molecular weight of the polyolefin; a smaller ratio gives a higher molecular weight. By polymerizing in multiple polymerization zones having different ratios of hydrogen to the sum of olefins in the reaction gas mixture of the polymerization zones, the molecular weight distribution of the polyolefins is broadened.

The polymerization of the present disclosure is carried out in at least three polymerization zones which differ in the ratio of hydrogen to the sum of olefins in the reaction gas mixture within the polymerization zones, expressed as ratios of the volume fractions. At least one of the polymerization zones has a ratio of hydrogen to the sum of olefins which is a factor of at least 1.5 lower than the ratio of hydrogen to the sum of olefins in the polymerization zone having the highest ratio of hydrogen to the sum of olefins and which is a factor of at least 1.5 higher than the ratio of hydrogen to the sum of olefins in the polymerization zone having the lowest ratio of hydrogen to the sum of olefins. Accordingly, the ratio of hydrogen to the sum of olefins in the polymerization zone having the highest ratio of hydrogen to the sum of olefins and in the polymerization zone having the lowest ratio of hydrogen to the sum of olefins differ at least by a factor of 2.25. In some embodiments, at least one polymerization zone has a ratio of hydrogen to the sum of olefins which is a factor of at least 2 lower than the ratio of hydrogen to the sum of olefins in the polymerization zone having the highest ratio of hydrogen to the sum of olefins and which is a factor of at least 2 higher than the ratio of hydrogen to the sum of olefins in the polymerization zone having the lowest ratio of hydrogen to the sum of olefins.

In some embodiments and in polymerization zones wherein the polymer particles are transported through a part of the reactor, the ratio of hydrogen to the sum of olefins varies within the polymerization zone. In some embodiments, the variation is for polymerizations in the presence of one or more inert components. As the reaction gas mixture moves along, the olefins are consumed by polymerization while the concentration of hydrogen remains constant. Consequently, the volume fraction(s) of the olefin(s) may decrease while the concentration of hydrogen remains constant. In such a case, the olefin concentration in this polymerization zone is the average of the maximum olefin concentration in this polymerization zone and the minimum olefin concentration in this polymerization zone, which is the sum of the maximum olefin concentration and the minimum olefin concentration divided by two.

In an embodiment of the present disclosure, the gas-phase reactor has more than three polymerization zones. In some embodiments, the gas-phase reactor has four, five, six, seven or more polymerization zones. In some embodiments, the polymerization zones differ in the ratio of hydrogen to the sum of olefins in the reaction gas mixture in the polymerization zones. In some embodiments, two or more polymerization zones have the same or a similar ratio of hydrogen to the sum of olefins in the reaction gas mixture in the polymerization zones. In some embodiments, two or more polymerization zones have a ratio of hydrogen to the sum of olefins which is identical or similar to the ratio of hydrogen to the sum of olefins of the polymerization zone having the highest ratio of hydrogen to the sum of olefins. In some embodiments, two or more polymerization zones have a ratio of hydrogen to the sum of olefins which is identical or similar to the ratio of hydrogen to the sum of olefins of the polymerization zone having the lowest ratio of hydrogen to the sum of olefins. In some embodiments, two or more polymerization zones have a ratio of hydrogen to the sum of olefins which is a factor of at least 1.5 lower than the ratio of hydrogen to the sum of olefins in the polymerization zone having the highest ratio of hydrogen to the sum of olefins and which is a factor of at least 1.5 higher than the ratio of hydrogen to the sum of olefins in the polymerization zone having the lowest ratio of hydrogen to the sum of olefins.

At least two of the polymerization zones of the process of the present disclosure are sub-zones of a polymerization unit wherein the growing polymer particles flow downward in a densified form. In some instances, a polymerization unit wherein the growing polymer particles flow downward in a densified form is called "downcomer". In some instances, such a polymerization unit is designated "moving bed" or "settled bed" unit or reactor.

As used herein, the term "densified form" of the polymer means that the ratio between the mass of polymer and the reactor volume is higher than 80% of the "poured bulk density" of the resulting polymer. For examples, when a polymer bulk density is equal to 420 kg/m$^3$, a "densified form" of the polymer means that the polymer mass/reactor volume ratio is at least 336 kg/m$^3$. The "poured bulk density" of a polymer is a parameter measured according to DIN EN ISO 60: 1999. As used herein, the density of solid inside the reactor is defined as the mass of polymer per volume of reactor occupied by the polymer.

In some instances, a downcomer is a polymerization unit containing a bed of growing polymer particles, which moves downwards in a plug flow mode. As used herein, "plug flow mode" means that there is little or no backmixing of the polymer particles. In some embodiments, the polymer particles flow downwards in the downcomer with a velocity of from 0.01 to 0.7 m/s, alternatively from 0.1 to 0.6 m/s, alternatively from 0.15 to 0.5 m/s.

In some embodiments, for replacing reacted olefins or controlling the gas flow within the downcomer, gaseous or liquid feed streams are introduced at one or more positions into the downcomer. In some embodiments, feed streams are made from or contain the main monomer. In some embodiments, feed streams are further made from or contain one or more comonomers, inert components, or hydrogen. In some embodiments, an inert component is propane. In some embodiments and depending on the amounts of added gaseous or liquid feed streams to the downcomer and the pressure conditions within the downcomer, the gaseous medium surrounding the polymer particles move downwards concurrently with the polymer particles or upward counter-currently to the polymer particles. In some embodiments and when feeding liquid streams to the downcomer, these liquid streams vaporize within the downcomer, thereby contributing to the composition of the reaction gas mixture within the downcomer. In some embodiments and when operating the downcomer with more than one feed stream, the feeding points for introducing the feed streams into the downcomer are evenly distributed over the height of the downcomer.

In some embodiments, the bottom of the downcomer is equipped with a control valve for controlling the flow of the growing polymer particles from the downcomer into the riser. In some embodiments, the control valve is a mechanical valve. In some embodiments, the mechanical valve is a simple or double butterfly valve or a ball valve. In some embodiments, a stream of a gas is fed into the lower part of the downcomer at one or more positions shortly above the control valve to facilitate the flow of the growing polymer particles through the control valve. In some instances, the stream of gas is designated a "dosing gas." In some embodiments, the dosing gas is taken from a recycling stream of unreacted monomers downstream of the compressor. In some embodiments, varying the opening of the control valve and/or varying the flow rate of the dosing gas adjusts the velocity of the polymer particles within the downcomer.

According to the process of the present disclosure, the polymerization unit wherein the growing polymer particles flow downward in a densified form, has at least two sub-zones which differ in the ratio of hydrogen to the sum of olefins in the reaction gas mixtures within these sub-zones. In some embodiments, the different gas compositions are established by introducing liquid or gaseous feed streams into a middle part of the downcomer. In case of an overall downward gas stream, the gas composition in a lower part of the downcomer is then a combination of the gas streaming downwards through the upper part of the downcomer and the gas components derived from the additionally injected liquid or gaseous feed streams dosed into the middle part(s) of the downcomer. In case of an overall upward gas stream, the gas composition in an upper part of the downcomer is then a combination of the gas streaming upwards through the lower part of the downcomer and the gas components derived from the additionally injected liquid or gaseous feed streams dosed into the middle part(s) of the downcomer. In some embodiments, a major part of the streams fed to the downcomer is fed to a middle part of the downcomer, thereby creating an upward gas stream in one or more upper sub-zones of the downcomer and a downward gas stream in one or more lower sub-zones of the downcomer. In some embodiments, the gas compositions in the respective sub-zones is established by feeding in the vicinity of the feeding point(s) of the major part of feed stream(s) additional feed streams, thereby creating the intended gas composition of the reaction gas mixtures.

In some embodiments, the gaseous medium surrounding the polymer particles moves downwards concurrently with the polymer particles. The gas composition in a lower part of the downcomer is a combination of the gas streaming downwards through the upper part of the downcomer and the gas components derived from the additionally injected liquid or gaseous feed streams dosed into the middle part(s) of the downcomer.

In the process of the present disclosure, the growing polymer particles enter the downcomer at the top and leave the downcomer at the bottom. The process includes a step of transporting growing polymer particle from the outlet of the downcomer to the inlet of the downcomer. The unit of the polymerization reactor which accomplishes the transport of the polymer particles from the outlet of the downcomer to the inlet of the downcomer forms one of the polymerization zones within the gas-phase polymerization reactor. In some embodiments, the transport of the growing polymer particles from the outlet of the downcomer to the inlet of the downcomer occurs by a unit operating as a fluidized bed reactor. In some embodiments, the downcomer is positioned within, around or adjacent to the gas-phase reactor.

Fluidized-bed reactors are reactors wherein polymerization takes place in a bed of polymer particles maintained in a fluidized state by feeding a reaction gas mixture at the lower end of the reactor and taking off the gas again at the reactor's upper end. In some instances, the reaction gas mixture is fed below a gas distribution grid having the function of dispensing the gas flow. The reaction gas mixture is then returned to the lower end of the reactor via a recycle line equipped with a compressor and a heat exchanger for removing the heat of polymerization. The velocity of the reaction gas mixture is high enough to fluidize the mixed bed of finely divided polymer present in the tube serving as polymerization zone and to remove the heat of polymerization.

In some embodiments, the transport of the growing polymer particles from the outlet of the downcomer to the inlet of the downcomer occurs by a riser wherein the polymerization unit is operating under fast fluidization or transportation conditions. Fast fluidization conditions inside the riser are established by feeding a reaction gas mixture at a velocity higher than the transport velocity of the polymer particles. In some embodiments, the velocity of the reaction gas mixture is between 0.5 and 15 m/s, alternatively between 0.8 and 5 m/s. The terms "transport velocity" and "fast fluidization conditions" are used herein as defined in "D. Geldart, Gas Fluidization Technology, page 155 et seq., J. Wiley & Sons Ltd., 1986".

In some embodiments, the gas-phase polymerization reactor is a multizone circulating reactor. In s some embodiments, the reactors are as described in Patent Cooperation Treaty Publication Nos. WO 97/04015 A1 and WO 00/02929 A1 and have two interconnected polymerization zones, a riser wherein the growing polymer particles flow upward under fast fluidization or transport conditions, and a downcomer wherein the growing polymer particles flow in a densified form under the action of gravity. The polymer particles leaving the riser enter the downcomer and the polymer particles leaving the downcomer are reintroduced into the riser, thereby establishing a circulation of polymer between the two polymerization zones and the polymer is passed alternately a plurality of times through these two zones. In such polymerization reactors, a solid/gas separator is arranged above the downcomer to separate the polyolefin and reaction gaseous mixture coming from the riser. The growing polyolefin particles enter the downcomer and the separated reaction gas mixture of the riser is continuously recycled through a gas recycle line to one or more points of reintroduction into the polymerization reactor. In some embodiments, the major part of the recycle gas is recycled to the bottom of the riser. In some embodiments, the recycle line is equipped with a compressor and a heat exchanger for removing the heat of polymerization. In some embodiments, a line for the catalyst feed is arranged on the riser and a polymer discharge system is located in the bottom portion of the downcomer. In some embodiments, the introduction of make-up monomers, comonomers, hydrogen and/or inert components occur at various points along the riser and the downcomer.

Polymerization in a polymerization reactor having a riser for transporting the growing polymer particle from the outlet of the downcomer to the inlet of the downcomer provides that the growing polymer particles pass repeatedly the polymerization zones of the polymerization reactor. In some embodiments, a gas-phase polymerization reactor yields homogeneous multi-modal olefin polymers with improved polymer property combinations.

In some embodiments, a polymerization zone accomplishes a transport of polymer particles from the outlet of the downcomer to the inlet of the downcomer such as a riser or a polymerization zone having a fluidized bed of growing polymer particles, different polymerization conditions are established between the polymerization zone and the uppermost sub-zone of the downcomer, and the reaction gas mixture leaving the transporting polymerization zone is partially or totally prevented from entering the downcomer. In some embodiments, a barrier fluid in form of a gas and/or liquid mixture is fed into the downcomer. In some embodiments, the barrier fluid is fed in the upper part of the downcomer. In some embodiments, the barrier fluid has a composition which is different from the gas mixture in the riser. In some embodiments, the amount of added barrier fluid is adjusted in a way that an upward flow of gas countercurrent to the flow of the polymer particles is generated, alternatively at the top thereof, thereby acting as a barrier to the gas mixture entrained with the particles coming from the riser.

In some embodiments, the barrier fluid comes from a recycle gas stream. In some embodiments, the barrier fluid is obtained by partly condensing the stream. In some embodiments, the barrier fluid contains, besides the monomers to be polymerized, inert compounds used as a polymerization diluent, hydrogen or other components of the reaction gas mixture. In some embodiments, the polymerization diluents are nitrogen or alkanes having from 1 to 10 carbon atoms In some embodiments, the preparation of the barrier fluid is accomplished by separating off a part of the recycle gas stream, passing the separated gas through a heat-exchanger for partly condensing and separating the resulting liquid-gas mixture in a liquid and a gaseous stream. In some embodiments, the separating step occurs downstream of the compressor and upstream of the heat exchanger and in the recycle line. In some embodiments, the barrier fluid has a composition such that when the barrier fluid is vaporized, the gas produced has less than 0.5 vol. % hydrogen, alternatively less than 0.2 vol. % hydrogen, alternatively less than 0.1 vol. % hydrogen. In some embodiments, a feed stream made from or containing ethylene and optionally one or more comonomers is introduced into the downcomer together with the barrier fluid or in close proximity to the feeding point of the barrier fluid.

In some embodiments, a part of the recycle gas stream is fed into a distillation column, into which this stream is separated into a liquid which can be withdrawn from the bottom of the distillation column and a gaseous fraction which can be withdrawn from the top of the distillation column. In some embodiments, the part of the recycle gas stream is withdrawn from the recycle line downstream of the compressor and upstream of the heat exchanger. By employing a distillation column for producing the liquid to be fed as barrier fluid to the downcomer, a lower hydrogen content in this liquid is achievable than by using a single heat-exchanger in combination with a liquid-gas separator. In some embodiments, a combination of two or more distillation columns is used instead of a single distillation column.

In some embodiments, the barrier fluid is fed in liquid form into the upper part of the polymerization unit wherein the growing polymer particles flow downward in a densified form.

In some embodiments, when the gas-phase polymerization reactor has more than three polymerization zones which differ in the ratio of hydrogen to the sum of olefins in the reaction gas mixture in the polymerization zones, a polymerization zone is formed by the unit transporting the growing polymer particle from the outlet of the downcomer to the inlet of the downcomer and the further polymerization zones of a different ratio of hydrogen to the sum of olefins are sub-zones established within the downcomer. In some embodiments, the transporting unit is a riser or a unit having a fluidized bed of growing polymer particles. In some embodiments, the downcomer has two, three, four or more sub-zones having different ratios of hydrogen to the sum of olefins in the reaction gas mixtures. In some embodiments, the downcomer has two, or more sub-zones which have the same or a similar ratio of hydrogen to the sum of olefins in the reaction gas mixture. In some embodiments, the downcomer has two or three, alternatively two sub-zones which differ from each other in the ratio of hydrogen to the sum of olefins in the reaction gas mixture in the sub-zones by a factor of more than 1.5.

In some embodiments, the difference in the ratio of hydrogen to the sum of olefins in the reaction gas mixtures within the sub-zones of the polymerization unit, wherein the growing polymer particles flow downward in a densified form, is obtained by feeding a part of a recycle gas stream to at least one of the sub-zones of the polymerization unit wherein the growing polymer particles flow downward in a densified form. In some embodiments, this recycle gas is introduced into the downcomer as component of a feed stream made from or containing ethylene and optionally one or more comonomers.

In some embodiments, a part of the recycle gas stream is fed into a distillation column, into which this stream is separated into a liquid which can be withdrawn from the bottom of the distillation column and a hydrogen-rich gaseous fraction which can be withdrawn from the top of the distillation column and the difference in the ratio of hydrogen to the sum of olefins within the sub-zones of the polymerization unit, wherein the growing polymer particles flow downward in a densified form, is obtained by feeding a part of the hydrogen-rich gaseous fraction withdrawn from the top of the distillation column to at least one of the sub-zones of the polymerization unit wherein the growing polymer particles flow downward in a densified form. In some embodiments, the part of the recycle gas stream is withdrawn from the recycle line downstream of the compressor and upstream of the heat exchanger. In some embodiments, a combination of two or more distillation columns is used instead of a single distillation column. In some embodiments, this hydrogen-rich gas is introduced into the downcomer as component of a feed stream made from or containing ethylene and optionally one or more comonomers.

In some embodiments, the hold-up of polymer particles in the polymerization unit, wherein the growing polymer particles flow downward in a densified form, is from 55 wt. % to 80 wt. % of the total hold-up of polymer particles in the gas-phase polymerization reactor.

In some embodiments, the polymerization in the gas-phase polymerization reactor is carried out in a condensing or super-condensing mode, wherein part of the circulating reaction gas mixture is cooled to below the dew point and returned to the reactor separately as a liquid and a gas-phase or together as a two-phase mixture, thereby using the enthalpy of vaporization for cooling the reaction gas.

In some embodiments, the gas-phase polymerization reactor is part of a reactor cascade. In some embodiments, the further polymerization reactors of the reactor cascade are any kind of low-pressure polymerization reactors such as gas-phase reactors or suspension reactors. In some embodiments, if the polymerization process of the reactor cascade includes a polymerization in suspension, the suspension polymerization is carried out upstream of the gas-phase polymerization. In some embodiments, reactors for carrying out the suspension polymerization are loop reactors or stirred tank reactors. In some embodiments, suspension media are inter alia inert hydrocarbons or the monomers themselves. In some embodiments, the inert hydrocarbons are isobutane or mixtures of hydrocarbons. In some embodiments, the additional polymerization stages are carried out in suspension and include a pre-polymerization stage. In some embodiments, when the multistage polymerization of olefins includes additional polymerization stages carried out in gas-phase, the additional gas-phase polymerization reactors are any type of gas-phase reactors like horizontally or vertically stirred gas-phase reactors, fluidized-bed reactors or multizone circulating reactors. In some embodiments, the additional gas-phase polymerization reactors are arranged downstream or upstream of the gas-phase polymerization reactor having three or more polymerization zones which differ in the ratio of hydrogen to the sum of olefins in the reaction gas mixture. In some embodiments, the gas-phase polymerization reactor is part of a reactor cascade wherein a fluidized-bed polymerization reactor is arranged upstream of the gas-phase polymerization reactor.

FIG. 1 shows schematically a set-up of a polymerization reactor cascade having a fluidized-bed reactor and a multizone circulating reactor for carrying out the process of the present disclosure.

The first gas-phase reactor, fluidized-bed reactor (1), includes a fluidized bed (2) of polyolefin particles, a gas distribution grid (3) and a velocity reduction zone (4). In some embodiments, the velocity reduction zone (4) is of increased diameter compared to the diameter of the fluidized-bed portion of the reactor. The polyolefin bed is kept in a fluidization state by an upward flow of gas fed through the gas distribution grid (3) placed at the bottom portion of the reactor (1). The gaseous stream of the reaction gas mixture leaving the top of the velocity reduction zone (4) via recycle line (5) is compressed by compressor (6), transferred to a heat exchanger (7), wherein the reaction gas mixture is cooled, and then recycled to the bottom of the fluidized-bed reactor (1) at a point below the gas distribution grid (3) at position (8). In some embodiments, the recycle gas is cooled to below the dew point of one or more of the recycle gas components in the heat exchanger, thereby operating the reactor with condensed material, that is, in the condensing mode. In some embodiments, the recycle gas is made from or contains unreacted monomers, inert condensable gases, inert non-condensable gases. In some embodiments, the inert condensable gases are alkanes. In some embodiments, the inert non-condensable gas is nitrogen. In some embodiments, make-up monomers, hydrogen, and optional inert gases or process additives are fed into the reactor (1) at various positions. In some embodiments, the components are fed via line (9) upstream of the compressor (6). In some embodiments, the catalyst is fed into the reactor (1) via a line (10). In some embodiments, line (10) is placed in the lower part of the fluidized bed (2).

The polyolefin particles obtained in fluidized-bed reactor (1) are discontinuously discharged via line (11) and fed to a solid/gas separator (12). The gaseous mixture coming from the fluidized-bed reactor (1) enters the second gas-phase reactor. The gas leaving solid/gas separator (12) exits the reactor via line (13) as off-gas while the separated polyolefin particles are fed via line (14) to the second gas-phase reactor.

The second gas-phase reactor is a multizone circulating reactor (21) having a riser (22) and a downcomer (23) which are repeatedly passed by the polyolefin particles. Within riser (22), the polyolefin particles flow upward under fast fluidization conditions along the direction of arrow (24). Within the downcomer (23) the polyolefin particles flow downward under the action of gravity along the direction of the arrow (25). The riser (22) and the downcomer (23) are interconnected by the interconnection bends (26) and (27).

After flowing through the riser (22), the polyolefin particles and the reaction gas mixture leave riser (22) and conveyed to a solid/gas separation zone (28). In some embodiments, solid/gas separation is effected by a centrifugal separator like a cyclone. From the separation zone (28) the polyolefin particles enter downcomer (23).

The reaction gas mixture leaving the separation zone (28) is recycled to the riser (22) by a recycle line (29), equipped with a compressor (30) and a heat exchanger (31). Between the compressor (30) and the heat exchanger (31), the recycle line (29) splits and the gaseous mixture is divided into two separated streams: line (32) conveys a part of the recycle gas into the interconnection bend (27) while line (33) conveys another part the recycle gas to the bottom of riser (22), thereby establishing fast fluidization conditions therein.

The polyolefin particles coming from the first gas-phase reactor via line (14) enter multizone circulating reactor (21) at the interconnection bend (27) in position (34). The polyolefin particles obtained in multizone circulating reactor (21) are continuously discharged from the bottom part of downcomer (23) via the discharge line (35).

A part of the gaseous mixture leaving the separation zone (28) exits the recycle line (29) after having passed the compressor (30) and is sent through line (36) to the heat exchanger (37), where the gaseous mixture is cooled to a temperature at which the monomers and the optional inert gas are partially condensed. A separating vessel (38) is placed downstream of the heat exchanger (37). The separated liquid is withdrawn from the separating vessel (38) via line (39) and fed to downcomer (23) through lines (40), (41) and (42) by a pump (43), wherein the feed stream introduced via line (40) is supplied to generate the barrier for preventing the reaction gas mixture of the riser (22) from entering the downcomer (23). In some embodiments, make-up monomers, make-up comonomers, and optionally inert gases and/or process additives are introduced via line (44) into line (41) and then fed into downcomer (23) at dosing point (45) and are introduced via line (46) into line (42) and then fed into the downcomer (23) at dosing point (47). In some embodiments, make-up monomers, make-up comonomers, and optionally inert gases and/or process additives are further introduced into recycle line (29) via line (48). The gaseous mixture obtained as gas-phase in separating vessel (38) is recirculated to the recycle line (29) through line (49). Line (50) serves for additionally feeding amounts of the recycle gas mixture to dosing point (47).

The bottom of the downcomer (23) is equipped with a control valve (51) having an adjustable opening for adjusting the flow of polyolefin particles from downcomer (23) through interconnection bend (27) into the riser (22). Above the control valve (51), amounts of a recycle gas mixture coming from the recycle line (29) through line (52) are introduced into the downcomer (23) to facilitate the flow of the polyolefin particles through the control valve (51).

Figure 2:
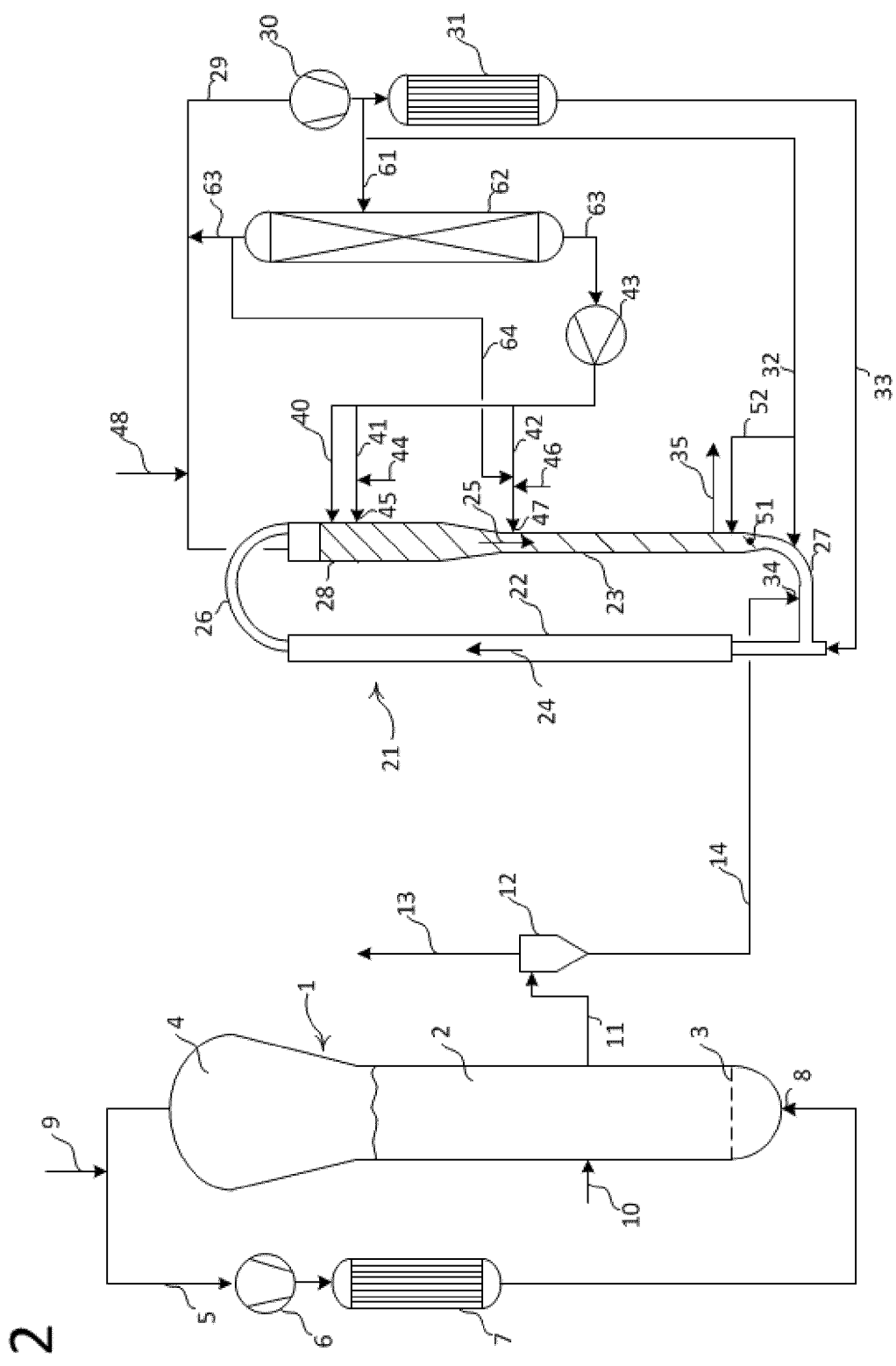
FIG. 2 shows schematically another set-up for carrying out the process of the present disclosure.

FIG. 2 shows schematically another set-up of a polymerization reactor cascade having a fluidized-bed reactor and a multizone circulating reactor for carrying out the process of the present disclosure. The FIG. 2 set-up differs from the set-up displayed in FIG. 1 in the manner of obtaining a liquid for being fed into downcomer (23), from the gaseous mixture.

A part of the gaseous mixture leaving separation zone (28) exits recycle line (29) after having passed compressor (30) and is sent via line (61) to a distillation column (62) for being separated into a liquid and a gaseous fraction. The liquid withdrawn from the bottom of distillation column (62) via line (63) is fed to downcomer (23) through lines (40), (41) and (42) by pump (43), wherein the feed stream introduced via line (40) is supplied to generate the barrier for preventing the reaction gas mixture of riser (22) from entering downcomer (23). The gaseous mixture withdrawn from the top of distillation column (62) is recirculated to recycle line (29) through line (63). A part of the gaseous mixture withdrawn from the top of distillation column (62) is further fed via line (64) to dosing point (47).

In some embodiments, the process of the present disclosure yields polyethylenes having a density of from 0.916 to 0.964 g/cm$^3$, alternatively from 0.935 to 0.960 g/cm$^3$, determined according to DIN EN ISO 1183-1:2004, Method A (Immersion), and a MFR$_{21.6}$ at a temperature of 190° C. under a load of 21.6 kg, determined according to DIN EN ISO 1133-1:2012-03, of from 0.5 to 300 g/10 min, alternatively of from 1 to 100 g/10 min, alternatively of from 1.2 to 100 g/10 min, alternatively of from 1.5 to 50 g/10 min. In some embodiments, the resulting polyethylenes are useful for preparing blow molded articles.

EXAMPLES

The melt flow rate MFR$_{21.6}$ was determined according to DIN EN ISO 1133-1:2012-03 at a temperature of 190° C. under a load of 21.6 kg.

The melt flow rate MFR$_5$ was determined according to DIN EN ISO 1133-1:2012-03 at a temperature of 190° C. under a load of 5 kg.

The melt flow rate MFR$_{2.16}$ was determined according to DIN EN ISO 1133-1:2012-03 at a temperature of 190° C. under a load of 2.16 kg.

The Flow Rate Ratio FRR is the ratio of MFR$_{21.6}$/MFR$_5$.

The density was determined according to DIN EN ISO 1183-1:2004, Method A (Immersion) with compression molded plaques of 2 mm thickness. The compression molded plaques were prepared with a defined thermal history: pressed at 180° C., 20 MPa for 8 min with subsequent crystallization in boiling water for 30 min.

The swell ratio was measured in a high-pressure capillary rheometer (Rheograph25, Gottfert Werkstoff-Prufmaschinen GmbH, Buchen, Germany) at a shear rate of 1440 s$^{-1}$ in a 30/2/2/20 round-perforation die with conical inlet (angle=20°, D=2 mm, L=2 mm, total length=30 mm) at a temperature of 190° C., using a laser-diode placed at a distance of 78 mm from the die exit. The extrudate was cut (by an automatic cutting device from Gottfert) at a distance of 150 mm from the die-exit, at the moment the piston reaches a position of 96 mm from the die-inlet. Swell ratio (SR) [%] is defined as difference $(d_{max}-d_d) \times 100$ divided by $d_d$ with $d_{max}$ being the maximum diameter of the strand and $d_d$ being the diameter of the die; SR=$(d_{max}-d_d)$ 100%/$d_d$.

The environmental stress cracking resistance was determined by a full notch creep test (FNCT) in accordance with international standard ISO 16770:2004 in aqueous surfactant solution. From the polymer sample, a compression molded 10 mm thick sheet was prepared. The bars with squared cross sections (10×10×100 mm) were notched using a razor blade on four sides perpendicularly to the stress direction. A notching device as described in M. Fleissner in Kunst-stoffe 77 (1987), pp. 45 was used for the sharp notch with a depth of 1.6 mm. The load applied was calculated from tensile force divided by the initial ligament area. Ligament area was the remaining area=total cross-section area of specimen minus the notch area. For FNCT specimen: 10×10 mm$^2$–4 times of trapezoid notch area=46.24 mm$^2$ (the remaining cross-section for the failure process/crack propagation). The test specimen was loaded using standard conditions as suggested by the ISO 16770 with constant load of 4 MPa at 80° C. in an aqueous solution of 2% by weight of ARKOPAL N100. The elapsed time until the rupture of the test specimen was detected.

Example 1

A polyethylene was prepared in a cascade of a fluidized-bed reactor and a multizone circulating reactor (MZCR) having two interconnected reaction zones as shown in FIG. 1, where the downcomer of the MZCR had two sub-zones having a different ratio of hydrogen to the sum of olefins in the reaction gas mixture.

9.1 g/h of a Ziegler-Natta catalyst, which was prepared according to Example 1a of Patent Cooperation Treaty Publication No. WO 2014/202420 A1 with a molar feed ratio of electron donor/Ti of 8, were fed using 5 kg/h of liquid propane to a first stirred precontacting vessel, into which triisobutylaluminum (TIBA), diethylaluminum chloride (DEAC) and tetrahydrofuran (THF) were dosed. The weight ratio of triisobutylaluminum to diethylaluminum chloride was 7:1. The weight ratio of the aluminum alkyls to the catalyst solid was 5:1. The weight ratio of the aluminum alkyls to THF was 70:1. The first precontacting vessel was kept at 50° C. with a residence time of 30 minutes. The catalyst suspension of the first precontacting vessel was continuously transferred to a second stirred precontacting vessel, which was operated with a residence time of 30 minutes and kept at 50° C. The catalyst suspension was then transferred continuously to fluidized-bed reactor (1) via line (10).

In the fluidized-bed reactor (1), ethylene was polymerized in the presence of propane as an inert diluent using hydrogen as a molecular weight regulator. 42 kg/h of ethylene and 120 g/h of hydrogen were fed to the fluidized-bed reactor (1) via line (9). No comonomer was added. The polymerization was carried out at a temperature of 80° C. and a pressure of 2.9 MPa. The selected feed rates resulted in the reactor in an ethylene concentration of 11.1 vol. % and a hydrogen concentration of 14.4 vol. %.

The polyethylene obtained in the fluidized-bed reactor (1) had an $MFR_{2.16}$ of 8 g/10 min and a density of 0.967 g/cm$^3$.

The polyethylene obtained in fluidized-bed reactor (1) was continuously transferred to multizone circulating reactor (21), which was operated at a pressure of 2.5 MPa and a temperature of 85° C. measured at the beginning of line (29) where the reaction gas mixture has just left separation zone (28). The riser (22) had an internal diameter of 200 mm and a length of 19 m. The downcomer (23) had a total length of 18 m, an upper part of 5 m with an internal diameter of 300 mm and a lower part of 13 m with an internal diameter of 150 mm. The final polymer was discontinuously discharged via line (35).

To prevent the reaction gas mixture of the riser (22) from entering the downcomer (23), 330 kg/h of a liquid stream were fed as barrier fluid into the upper part of the downcomer via line (40). The liquid for generating the barrier originated from partially condensing recycle gas mixture in heat exchanger (37) at working conditions of 52° C. and 2.5 MPa and separating liquid and gaseous components in separating vessel (38). The liquid barrier fluid had a composition that, when vaporized, yielded a gas having 6.5 vol. % ethylene, 0.12 vol. % hydrogen, 1.2 vol. % 1-hexene and 92 vol. % propane.

The monomers to the downcomer were fed in two positions; at a first dosing point (45) located just below the barrier and at a second dosing point (47) located 3 meters below the first dosing point. At the first dosing point (45), 15 kg/h of liquid coming from separating vessel (38), 12 kg/h of ethylene and 1.15 kg/h of 1-hexene, both fed via line (44), were introduced into the downcomer. At the second dosing point (47), 15 kg/h of liquid coming from separating vessel (38) and 6 kg/h of ethylene, fed via line (46), were introduced into the downcomer. To arrive at higher hydrogen content in the lower part of downcomer (23) than in the downcomer's upper part, 3 kg/h of the recycle gas composition were dosed to the second dosing point (47) via line (50). Additionally, 5 kg/h of propane, 22.3 kg/h of ethylene and 30 g/h of hydrogen were fed through line (48) into recycle line (29).

Of the final olefin polymer produced in the cascade of fluidized-bed reactor and a multizone circulating reactor, 50% by weight were produced in the first reactor and 50% by weight were produced in the second reactor.

The concentrations of monomers and hydrogen of the reaction gas mixtures within the riser and the downcomer of the MZCR are indicated in Table 1. Table 1 further reports the properties of the final olefin polymer discharged from the multizone circulating reactor.

Example 2

The polymerization of Example 1 was repeated under identical conditions except that the liquid fed into downcomer (23) originated from a distillation column (62) as shown in FIG. 2. Furthermore, the gas mixture introduced at the second dosing point (47) came from the top of distillation column (62), thereby increasing the hydrogen concentration in the lower part of the downcomer (23).

The liquid barrier fluid had a composition that, when vaporized, yielded a gas having 6.5 vol. % ethylene, 0.04 vol. % hydrogen, 1.2 vol. % 1-hexene and 92 vol. % propane.

Additional monomers were fed to the downcomer at two positions, at a first dosing point (45) located just below the barrier and at a second dosing point (47) located 3 meters below the first dosing point. At the first dosing point (45), 15 kg/h of liquid coming from the bottom of distillation column (62), 12 kg/h of ethylene and 1.15 kg/h of 1-hexene, both fed via line (44), were introduced into the downcomer. At the second dosing point (47), 15 kg/h of liquid coming from the bottom of distillation column (62) and 6 kg/h of ethylene were introduced into the downcomer via line (46). To arrive at higher hydrogen content in the lower part of downcomer (23) than in the downcomer's upper part, 2 kg/h of the gas coming from the top of distillation column (62) were dosed to the second dosing point (47) via line (64). Additionally, 5 kg/h of propane, 22.3 kg/h of ethylene and 35 g/h of hydrogen were fed through line (48) into recycle line (29).

The concentrations of monomers and hydrogen of the reaction gas mixtures within the riser and the downcomer of the MZCR are indicated in Table 1. Table 1 further reports the properties of the final olefin polymer discharged from the multizone circulating reactor. Comparative Example A The polymerization of Example 1 was repeated under identical conditions except that no recycle gas were dosed to the second dosing point (47) via line (50), thereby maintaining the composition of the reaction gas mixture within the downcomer constant over the whole length of the downcomer.

The liquid barrier fluid had a composition that, when vaporized, yielded a gas having 6.4 vol. % ethylene, 0.16 vol. % hydrogen, 1.2 vol. % 1-hexene and 92 vol. % propane.

At the first dosing point (45), 15 kg/h of liquid coming from separating vessel (38), 12 kg/h of ethylene and 1.15 kg/h of 1-hexene, both fed via line (44), were introduced into the downcomer. At the second dosing point (47), 15 kg/h of liquid coming from separating vessel (38) and 6 kg/h of ethylene, fed via line (46) were introduced into the downcomer. No recycle gas was introduced into the downcomer. Additionally, 5 kg/h of propane, 22.3 kg/h of ethylene and 28 g/h of hydrogen were fed through line (48) into the recycle line (29).

The concentrations of monomers and hydrogen of the reaction gas mixtures within the riser and the downcomer of the MZCR are indicated in Table 1. Table 1 further reports the properties of the final olefin polymer discharged from the multizone circulating reactor. Comparative Example B The polymerization of Example 1 was repeated under identical conditions except that the composition of the reaction gas mixture in the lower part of the downcomer was adapted to the reaction gas composition in the riser.

The liquid barrier fluid had a composition that, when vaporized, yielded a gas having 6.6 vol. % ethylene, 0.13 vol. % hydrogen, 1.3 vol. % 1-hexene and 92 vol. % propane.

At the first dosing point (45), 15 kg/h of liquid coming from separating vessel (38), 12 kg/h of ethylene and 1.15 kg/h of 1-hexene, both fed via line (44), were introduced into the downcomer. At the second dosing point (47), 15 kg/h of liquid coming from separating vessel (38) and 6 kg/h of ethylene were introduced into the downcomer via line (46). To arrive at higher hydrogen content in the lower part of downcomer (23) than in the downcomer's upper part, 10 kg/h of the recycle gas composition were dosed to the second dosing point (47) via line (50). Additionally, 5 kg/h of propane, 22.3 kg/h of ethylene and 30 g/h of hydrogen were fed through line (48) into recycle line (29).

The concentrations of monomers and hydrogen of the reaction gas mixtures within the riser and the downcomer of the MZCR are indicated in Table 1. Table 1 further reports the properties of the final olefin polymer discharged from the multizone circulating reactor.

The comparison between Examples 1 and 2 and Comparative Examples A and B shows that by carrying out an olefin polymerization in a gas-phase polymerization reactor having three polymerization zones, which differ in the ratio of hydrogen to the sum of olefins by more than a factor of 1.5, it is possible to obtain olefin polymers having a higher swell ratio and an increased environmental stress crack resistance compared to olefin polymer having the same density, melt flow rate, and breadth of the molecular weight distribution but being obtained by polymerization in a gas-phase polymerization reactor having two polymerization zones.

TABLE 1

| | Example 1 | Example 2 | Comparative Example A | Comparative Example B |
|---|---|---|---|---|
| Riser | | | | |
| Ethylene [vol. %] | 13.0 | 13.0 | 12.9 | 13.3 |
| Hydrogen [vol. %] | 1.56 | 2.18 | 1.61 | 1.33 |
| 1-Hexene [vol. %] | 0.60 | 0.60 | 0.63 | 0.65 |
| Ratio hydrogen/sum of olefins | 0.115 | 0.160 | 0.119 | 0.095 |
| Downcomer; upper polymerization zone | | | | |
| Ethylene [vol. %] | 5.9 | 6.2 | 5.6 | 5.8 |
| Hydrogen [vol. %] | 0.13 | 0.044 | 0.14 | 0.11 |
| 1-Hexene [vol. %] | 0.83 | 0.87 | 0.87 | 0.89 |
| Ratio hydrogen/sum of olefins | 0.019 | 0.006 | 0.022 | 0.016 |
| Downcomer; lower polymerization zone | | | | |
| Ethylene [vol. %] | 5.9 | 6.1 | 6.0 | 6.0 |
| Hydrogen [vol. %] | 0.35 | 0.34 | 0.12 | 0.65 |
| 1-Hexene [vol. %] | 0.68 | 0.68 | 0.68 | 0.69 |
| Ratio hydrogen/sum of olefins | 0.053 | 0.050 | 0.018 | 0.097 |
| Hydrogen ratios | | | | |
| Highest ratio hydrogen/sum of olefins/intermediate ratio hydrogen/sum of olefins | 2.2 | 3.2 | 5.4 | 1.0 |
| Intermediate ratio hydrogen/sum of olefins/ lowest ratio hydrogen/sum of olefins | 2.8 | 8.3 | 1.2 | 5.9 |
| Final polymer properties: | | | | |
| MFR$_{21.6}$ [g/10 min] | 7.8 | 8.0 | 8.2 | 8.1 |
| FRR | 20 | 21 | 19 | 19 |
| Density [g/cm$^3$] | 0.947 | 0.947 | 0.947 | 0.947 |
| Swell ratio [%] | 198 | 208 | 160 | 165 |
| FNCT [h] | 205 | 235 | 68 | 60 |

What is claimed is:

1. A process for preparing an olefin polymer comprising the step of:
    polymerizing an olefin in the presence of a polymerization catalyst and hydrogen as molecular weight regulator in a gas-phase polymerization reactor to yield growing polymer particles, the gas-phase polymerization reactor comprising
        three or more polymerization zones which differ in the ratio of hydrogen to the sum of olefins in the reaction gas mixture within the polymerization zones, expressed as ratios of the volume fractions, and
        at least two of the polymerization zones are sub-zones of a polymerization unit wherein the growing polymer particles flow downward in a densified form, and
    wherein at least one of the polymerization zones is
        a riser wherein growing polymer particles flow upwards under fast fluidization or transport conditions, or
        a zone wherein the polymerization occurs in a fluidized bed of growing polymer particles,
    wherein the gas-phase polymerization reactor comprises at least one polymerization zone,
        which has a ratio of hydrogen to the sum of olefins which is a factor of at least 1.5 lower than the ratio of hydrogen to the sum of olefins in the polymerization zone having the highest ratio of hydrogen to the sum of olefins, and
        a factor of at least 1.5 higher than the ratio of hydrogen to the sum of olefins in the polymerization zone having the lowest ratio of hydrogen to the sum of olefins.

2. The process of claim 1, wherein the gas-phase polymerization reactor is a multizone circulating reactor wherein a polymerization zone is a riser wherein growing polymer particles flow upwards under fast fluidization or transport conditions and the other polymerization zones are sub-zones of a downcomer wherein the growing polymer particles flow downward in a densified form, wherein the riser and the downcomer are interconnected and polymer particles leaving the riser enter the downcomer and polymer particles leaving the downcomer enter the riser, thereby establishing a circulation of polymer particles through the riser and the downcomer.

3. The process of claim 1, wherein a polymerization zone is a polymerization zone permits polymerization to occur in a fluidized bed of growing polymer particles.

4. The process of claim 1, wherein a barrier fluid in liquid form is fed into the upper part of a polymerization unit wherein the growing polymer particles flow downward in a densified form.

5. The process of claim 4, wherein the barrier fluid comprises a composition, when vaporized, yields a gas comprising less than 0.5 vol. % hydrogen.

6. The process of claim 4, wherein the barrier fluid is obtained by feeding a part of a recycle gas stream into a distillation column and withdrawing the barrier fluid from the bottom of the distillation column.

7. The process of claim 1, wherein the difference in the ratios of hydrogen to the sum of olefins in the sub-zones of the polymerization unit wherein the growing polymer particles flow downward in a densified form is obtained by feeding a part of a recycle gas stream to a sub-zone of the polymerization unit wherein the growing polymer particles flow downward in a densified form.

8. The process of claim 1, wherein the difference in the ratios of hydrogen to the sum of olefins in the sub-zones of the polymerization unit wherein the growing polymer particles flow downward in a densified form, is obtained by feeding a part of a recycle gas stream into a distillation column, withdrawing a hydrogen-rich gas from the top of the distillation column, and feeding the gas withdrawn from the top of the distillation column to a sub-zone of the polymerization unit wherein the growing polymer particles flow downward in a densified form.

9. The process of claim 1, wherein the gas-phase polymerization reactor is part of a reactor cascade.

10. The process of claim 9, wherein the reactor cascade comprises a fluidized bed reactor upstream of the gas-phase polymerization reactor.

11. The process of claim 1, wherein the polymerization catalyst is a Ziegler catalyst or a Ziegler-Natta-catalyst.

12. The process of claim 1, wherein the olefin polymer is an ethylene polymer prepared by homopolymerizing ethylene or copolymerizing ethylene with one or more comonomers.

13. The process of claim 12, wherein the ethylene polymer has a density of from 0.916 to 0.964 g/cm$^3$, determined according to DIN EN ISO 1183-1:2004, Method A (Immersion) and a MFR$_{21.6}$ at a temperature of 190° C. under a load of 21.6 kg, determined according to DIN EN ISO 1133-1: 2012-03, of from 0.5 to 300 g/10 min.

14. A process for preparing an olefin polymer comprising polymerizing one or more olefins in the presence of a polymerization catalyst and hydrogen as molecular weight regulator in a multizone circulating reactor having one polymerization zone which is a riser, in which growing polymer particles flow upwards under fast fluidization or transport conditions, and the other polymerization zones are sub-zones of a downcomer, in which the growing polymer particles flow downward in a densified form, wherein the riser and the downcomer are interconnected and polymer particles leaving the riser enter the downcomer and polymer particles leaving the downcomer enter the riser, thus establishing a circulation of polymer particles through the riser and the downcomer, wherein the multizone circulating reactor comprises three or more polymerization zones which differ in the ratio of hydrogen to the sum of olefins in the reaction gas mixture within the polymerization zones, expressed as ratios of the volume fractions, and at least two of the polymerization zones are sub-zones of the downcomer and at least one of the polymerization zones is the riser, and wherein the multizone circulating reactor comprises at least one polymerization zone, which has a ratio of hydrogen to the sum of olefins which is by a factor of at least 1.5 lower than the ratio of hydrogen to the sum of olefins in the polymerization zone having the highest ratio of hydrogen to the sum of olefins and which is by a factor of at least 1.5 higher than the ratio of hydrogen to the sum of olefins in the polymerization zone having the lowest ratio of hydrogen to the sum of olefins, and wherein a barrier fluid in liquid form is fed into the upper part of the downcomer.

15. The process of claim 14, wherein the barrier fluid is obtained by feeding a part of a recycle gas stream into a distillation column and withdrawing the barrier fluid from the bottom of the distillation column.

16. The process of claim 14, wherein the difference in the ratios of hydrogen to the sum of olefins in the sub-zones of the downcomer is obtained by feeding a part of a recycle gas stream into a distillation column and withdrawing a hydrogen-rich gas from the top of the distillation column and feeding the gas withdrawn from the top of the distillation column to at least one of the sub-zones of the downcomer.

17. A process for preparing an olefin polymer comprising polymerizing one or more olefins in the presence of a polymerization catalyst and hydrogen as molecular weight regulator in a reactor cascade comprising a fluidized bed reactor upstream of a multizone circulating reactor having one polymerization zone which is a riser, in which growing polymer particles flow upwards under fast fluidization or transport conditions, and the other polymerization zones are sub-zones of a downcomer, in which the growing polymer particles flow downward in a densified form, wherein the riser and the downcomer are interconnected and polymer particles leaving the riser enter the downcomer and polymer particles leaving the downcomer enter the riser, thus establishing a circulation of polymer particles through the riser and the downcomer, wherein the multizone circulating reactor comprises three or more polymerization zones which differ in the ratio of hydrogen to the sum of olefins in the reaction gas mixture within the polymerization zones, expressed as ratios of the volume fractions, and at least two of the polymerization zones are sub-zones of the downcomer and at least one of the polymerization zones is the riser, and wherein the multizone circulating reactor comprises at least one polymerization zone, which has a ratio of hydrogen to the sum of olefins which is by a factor of at least 1.5 lower than the ratio of hydrogen to the sum of olefins in the polymerization zone having the highest ratio of hydrogen to the sum of olefins and which is by a factor of at least 1.5 higher than the ratio of hydrogen to the sum of olefins in the polymerization zone having the lowest ratio of hydrogen to the sum of olefins.

18. The process of claim 17, wherein a barrier fluid in liquid form is fed into the upper part of the downcomer.

19. The process of claim 17, wherein all polymerization zones differ in the ratio of hydrogen to the sum of olefins in the reaction gas mixture in the polymerization zones.

* * * * *

UNITED STATES PATENT AND TRADEMARK OFFICE
CERTIFICATE OF CORRECTION

PATENT NO. : 10,968,293 B2
APPLICATION NO. : 16/348612
DATED : April 6, 2021
INVENTOR(S) : Meier et al.

Page 1 of 1

It is certified that error appears in the above-identified patent and that said Letters Patent is hereby corrected as shown below:

On the Title Page

Item (30), Line 1, delete "16198260" and insert -- 16198260.8 --, therefor

Signed and Sealed this
Twenty-fourth Day of January, 2023

Katherine Kelly Vidal
*Director of the United States Patent and Trademark Office*